US011339063B2

(12) United States Patent
Leys et al.

(10) Patent No.: US 11,339,063 B2
(45) Date of Patent: May 24, 2022

(54) FLUID CIRCUIT WITH INTEGRATED ELECTROSTATIC DISCHARGE MITIGATION

(71) Applicant: ENTEGRIS, INC., Billerica, MA (US)

(72) Inventors: John Leys, Chaska, MN (US); James C. Linder, Victoria, MN (US); Jeffrey James McKenzie, Watertown, MN (US); Barry Lee Gregerson, Excelsior, MN (US); Brett Christopher Reichow, Chanhassen, MN (US)

(73) Assignee: ENTEGRIS, INC., Billerica, MA (US)

( * ) Notice: Subject to any disclaimer, the term of this patent is extended or adjusted under 35 U.S.C. 154(b) by 462 days.

(21) Appl. No.: 16/287,847

(22) Filed: Feb. 27, 2019

(65) Prior Publication Data

US 2019/0337823 A1    Nov. 7, 2019

Related U.S. Application Data

(60) Provisional application No. 62/667,783, filed on May 7, 2018.

(51) Int. Cl.
  *F16L 25/01*    (2006.01)
  *C02F 1/46*    (2006.01)
  (Continued)

(52) U.S. Cl.
  CPC .......... *C02F 1/4602* (2013.01); *B01D 63/067* (2013.01); *F16L 25/01* (2013.01); *F16L 25/028* (2013.01); *H01B 1/14* (2013.01); *B01D 2201/50* (2013.01); *B01D 2239/0241* (2013.01); *C02F 2103/04* (2013.01)

(58) Field of Classification Search
  CPC .......... F16L 9/125; F16L 11/127; F16L 25/01
  See application file for complete search history.

(56) References Cited

U.S. PATENT DOCUMENTS 3,465,111 A * 9/1969 Breslin ................ H01B 7/0072
                                                        200/61.6
3,914,002 A * 10/1975 Berliner .................. F16L 25/01
                                                        439/192

(Continued)

FOREIGN PATENT DOCUMENTS

CH        707521 A2    7/2014
CN     102142430 A     8/2011

(Continued)

*Primary Examiner* — David Bochna
(74) *Attorney, Agent, or Firm* — Entegris, Inc.

(57) ABSTRACT

A fluid circuit includes a plurality of tubing segments and a plurality of operative components. Each tubing segment includes i) a non-conductive polymer portion defining a fluid passageway and ii) one or more interior conductive fluoropolymer stripes extending axially to the ends of each of the respective tubing segments. Each operative component includes a conductive fluoropolymer that extends between a plurality of tubing connector fittings forming a part of the fluid circuit, wherein each of the tubing connector fittings conductively connect the respective conductor of the operative component to the interior conductive fluoropolymer stripes of the tubing segment to provide a path to ground that extends through each operative component and each tubing segment.

20 Claims, 19 Drawing Sheets

(51) Int. Cl.
    *B01D 63/06*                 (2006.01)
    *H01B 1/14*                  (2006.01)
    *F16L 25/02*                 (2006.01)
    *C02F 103/04*               (2006.01)

(56) References Cited

U.S. PATENT DOCUMENTS

| | | | |
|---|---|---|---|
| 4,120,325 A * | 10/1978 | de Putter | F16L 25/01 138/145 |
| 4,127,840 A | 11/1978 | House | |
| 4,312,383 A * | 1/1982 | Kleykamp | F16L 11/1185 138/103 |
| 4,437,986 A | 3/1984 | Hutchins | |
| 4,675,780 A | 6/1987 | Barnes | |
| 4,854,887 A * | 8/1989 | Blandin | A47L 9/2889 439/194 |
| 4,953,636 A * | 9/1990 | Mohn | F16L 25/01 166/65.1 |
| 5,000,875 A * | 3/1991 | Kolouch | C08K 3/04 252/511 |
| 5,154,453 A | 10/1992 | Nishio | |
| 5,506,047 A | 4/1996 | Hedrick | |
| 5,672,832 A | 9/1997 | Cucci | |
| 5,678,435 A | 10/1997 | Hodson | |
| 5,869,766 A | 2/1999 | Cucci | |
| 6,012,336 A | 1/2000 | Eaton | |
| 6,179,132 B1 | 1/2001 | Moya | |
| 6,402,205 B1 | 6/2002 | Rose et al. | |
| 6,409,222 B1 | 6/2002 | Donoho | |
| 6,412,832 B1 | 7/2002 | Donoho | |
| 6,428,729 B1 | 8/2002 | Bhatt | |
| 6,595,240 B2 | 7/2003 | Leys | |
| 6,601,879 B2 | 8/2003 | Donoho | |
| 6,612,175 B1 | 9/2003 | Peterson | |
| 6,652,008 B2 | 11/2003 | Fischer | |
| 6,758,104 B2 | 7/2004 | Leys | |
| 6,776,440 B2 | 8/2004 | Nishio | |
| 6,789,781 B2 | 9/2004 | Johnson | |
| 7,063,304 B2 | 6/2006 | Leys | |
| 7,308,932 B2 | 12/2007 | Doh | |
| 7,347,937 B1 | 3/2008 | Cheng | |
| 7,383,967 B2 | 6/2008 | Gibson | |
| 7,690,692 B2 | 4/2010 | Athalye et al. | |
| 7,833,419 B2 | 11/2010 | Doucoure | |
| 8,561,855 B2 | 10/2013 | Hennen | |
| 8,689,817 B2 | 4/2014 | Leys | |
| 8,726,935 B2 | 5/2014 | Leys | |
| 2001/0046111 A1 * | 11/2001 | Koike | F16L 25/01 361/215 |
| 2002/0150711 A1 * | 10/2002 | Schulz | F16L 11/127 428/36.91 |
| 2004/0245169 A1 | 12/2004 | Breusch | |
| 2005/0236110 A1 | 10/2005 | Bhatt | |
| 2006/0099843 A1 | 5/2006 | Fullner | |
| 2006/0125233 A1 * | 6/2006 | Cantrell | F16L 25/01 285/256 |
| 2008/0102660 A1 * | 5/2008 | Wittwer | F16L 25/01 439/100 |
| 2014/0202946 A1 | 7/2014 | Asami | |
| 2019/0091617 A1 * | 3/2019 | Jaber | F16L 25/01 |
| 2019/0337823 A1 * | 11/2019 | Leys | F16L 25/01 |
| 2020/0103056 A1 * | 4/2020 | Puglia | F16L 9/125 |
| 2021/0071788 A1 * | 3/2021 | Linder | F16L 25/01 |

FOREIGN PATENT DOCUMENTS

| | | |
|---|---|---|
| CN | 205244650 U | 5/2016 |
| CN | 105793703 A | 7/2016 |
| CN | 103982338 B | 5/2017 |
| CN | 206175842 U | 5/2017 |
| CN | 107061880 A | 8/2017 |
| DE | 202010017917 U1 | 2/2013 |
| DE | 102012112563 A1 | 6/2013 |
| EP | 0160168 B1 | 5/1989 |
| EP | 07231431 A | 7/1996 |
| EP | 1191268 B1 | 12/2003 |
| JP | 614857 A | 1/1986 |
| JP | 2003278972 | 10/2003 |
| JP | 2004340304 A | 12/2004 |
| JP | 2016121792 A | 7/2016 |
| TW | M522298 U | 5/2016 |
| TW | 201805053 A | 2/2018 |
| WO | 9312281 A1 | 6/1993 |
| WO | 9715375 A1 | 5/1997 |
| WO | 2006017147 B1 | 2/2006 |
| WO | 2017210291 A2 | 12/2017 |

* cited by examiner

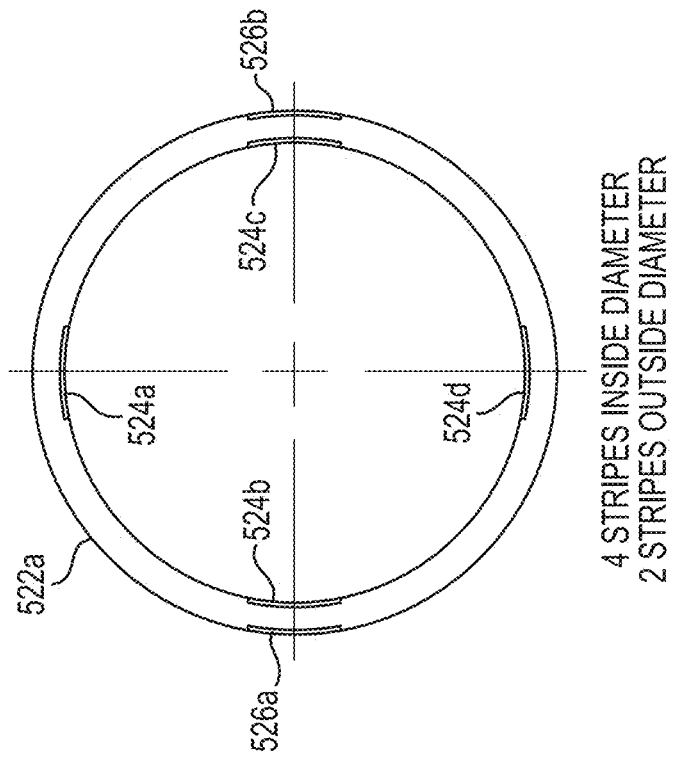
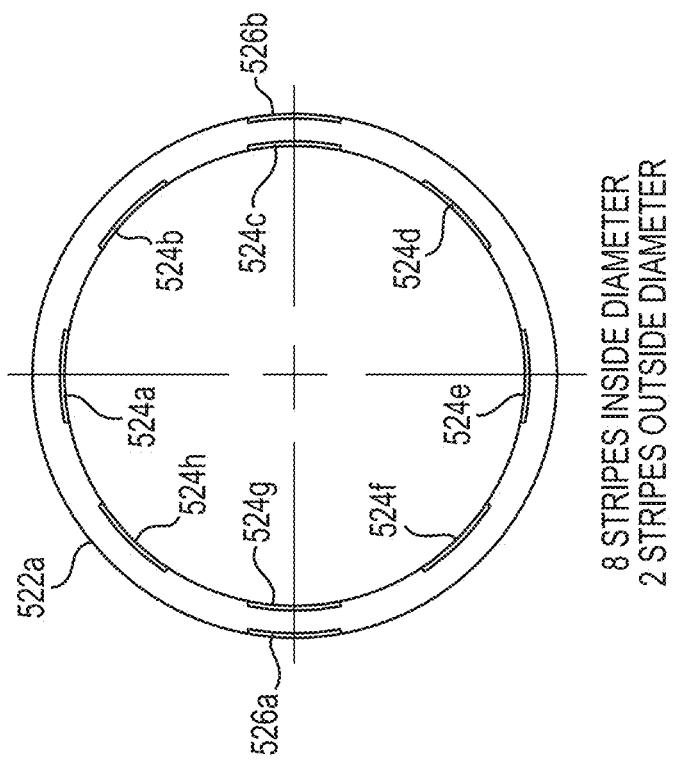

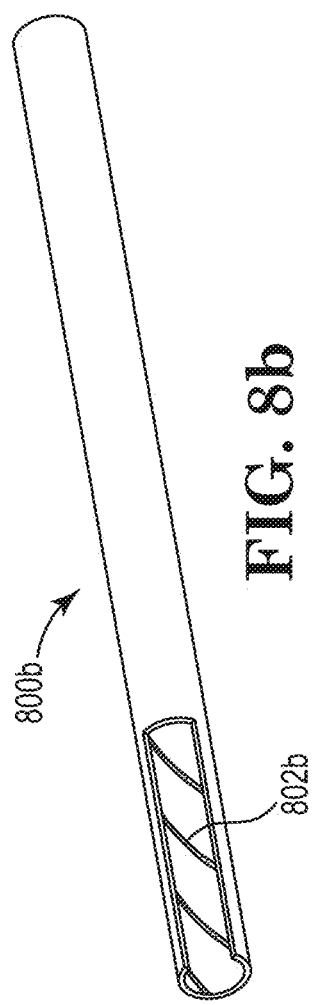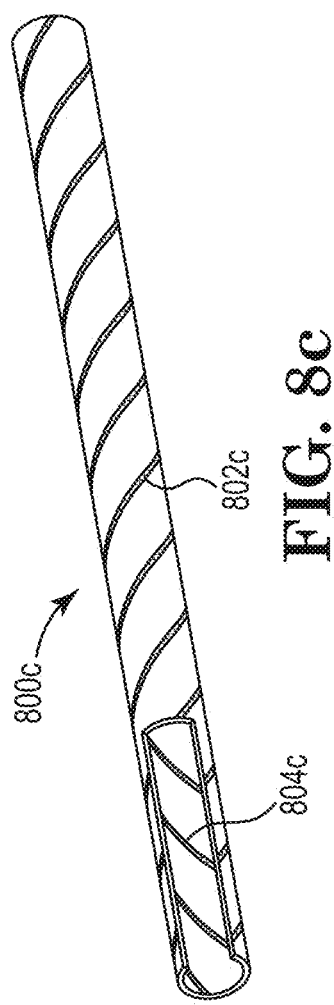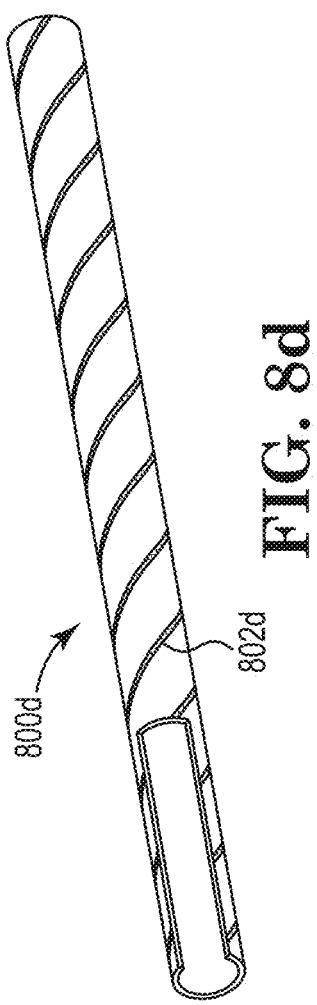

FLUID CIRCUIT WITH INTEGRATED ELECTROSTATIC DISCHARGE MITIGATION

CROSS-REFERENCE TO RELATED APPLICATION

This application claims the benefit under 35 USC 119 of U.S. Provisional Patent Application No. 62/667,783, filed May 7, 2018, the disclosure of which is hereby incorporated herein by reference in its entirety for all purposes.

TECHNICAL FIELD

Embodiments of the present disclosure are directed to fluid handling systems, and more specifically, to ultra-pure fluid handling systems with electrostatic discharge mitigation.

BACKGROUND

Fluid handling systems offering high purity standards have many uses in advanced technology applications. These applications include processing and manufacturing of solar panels, flat panel displays, and in the semiconductor industry for applications such as photolithography, bulk chemical delivery, chemical mechanical polishing (CMP), wet etch, and cleaning. Certain chemicals used in these applications are particularly corrosive, precluding the use of some conventional fluid handling technology because of possible corrosion of the fluid handling components and leaching of chemicals into the environment.

In order to meet the corrosion resistance and purity requirements for such applications, fluid handling systems provide tubing, fittings, valves, and other elements, that are made from inert polymers. These inert polymers may include, but are not limited to, fluoropolymers such as tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), and fluorinated ethylene propylene polymer (FEP). In addition to providing a non-corrosive and inert construction, many fluoropolymers, such as PFA, are injection moldable and extrudable. Several types of connector fittings, made from such polymers, are available and are known, such as PRIMELOCK® fittings, PILLAR® fittings, flared fittings, and other fittings. Exemplary fittings, for example, are illustrated in U.S. Pat. Nos. 5,154,453; 6,409,222; 6,412,832; 6,601,879; 6,758,104; and 6,776,440.

Electrostatic discharge (ESD) is an important technical issue for fluid handling systems in the semiconductor industry and in other technology applications. Frictional contact between fluids and surfaces of various operational components (e.g. tubing or piping, valves, fittings, filters, etc.) in the fluid system can result in generation and buildup of static electrical charges. The extent of charge generation depends on various factors including, but not limited to, the nature of the components and the fluid, fluid velocity, fluid viscosity, electrical conductivity of the fluid, pathways to ground, turbulence and shear in liquids, presence of air in the fluid, and surface area. These properties, and ways to mitigate the undesired static electrical charge caused by these properties, are discussed and reported in NFPA 77, "Recommended Practice on Static Electricity", pp. 77-1 to 77-67, 2014.

Further, as the fluid flows through the system, the charge can be carried downstream in a phenomenon called a streaming charge, where charge may buildup beyond where the charge originated. Sufficient charge accumulations can cause ESD at the tubing or pipe walls, component surfaces, or even onto substrates or wafers at various process steps.

In some applications, semiconductor substrates or wafers are highly sensitive to static electrical charges and such ESD can result in damage or destruction of the substrate or wafer. For example, circuits on the substrate can be destroyed and photoactive compounds can be activated prior to regular exposure due to uncontrolled ESD. Additionally, built up static charge can discharge from within the fluid handling system to the exterior environment, potentially damaging components in the fluid handling system (e.g. tubing or piping, fittings, components, containers, filters, etc.), that may lead to leaks, spills of fluid in the system, and diminished performance of components. In these situations, such discharge, may lead to potential fire or explosion when flammable, toxic and/or corrosive fluids are used in the compromised fluid handling system.

In some fluid handling systems, to reduce the buildup of static charges, certain metal or conductive components in fluid handling system are grounded to mitigate the buildup of static charge in the system as it continually disperses from the metal or conductive components to ground. Conventional use of multiple grounding straps may lead to undue mechanical clutter in a fluid handling system, and may lead to a complex grounding system network requiring extensive maintenance or a complex system that may lead to undesirable failure.

It would be desirable to improve ESD mitigation in ultra-pure fluid handling systems for improved component performance and reduction in potentially damaging ESD events.

SUMMARY

One or more embodiments of this disclosure are related to a fluid circuit in a fluid handling system with ESD mitigation. In one or more embodiments, the fluid circuit includes a plurality of conductive operative components and tubing segments.

In certain embodiments, a fluid circuit for a predetermined fluid flow passageway (such as gases or liquids, or both) having at least one inlet and at least one outlet, the fluid circuit comprises a plurality of tubing segments and a plurality of operative components, each operative component comprising a body portion with an internal fluid flow passageway and a plurality of tubing connector fittings, the operative components connecting the plurality of tubing segments at selected tubing connector fittings, the plurality of tubing segments and operative components providing the fluid flow passageway through the fluid circuit; wherein each tubing segment comprises i) a non-conductive polymer portion defining the fluid passageway and ii) one or more interior conductive fluoropolymer stripes extending axially to ends of each of the respective tubing segments, wherein each operative component body portion comprises a conductive fluoropolymer that extends between each of the plurality of tubing connector fittings, and wherein each of the tubing connector fittings conductively connect the respective conductor of the body portion to the interior conductive fluoropolymer stripes of the tubing segment.

Other disclosed embodiments are methods of making an electrostatic discharge mitigation fluid circuit for a predetermined fluid flow passageway having at least one inlet and at least one outlet comprising conductively connecting a plurality of tubing segments to a plurality of operative components, each operative component comprising a body portion with an internal fluid flow passageway and a plurality of tubing connector fittings, the operative components connecting the plurality of tubing segments at selected tubing connector fittings, the plurality of tubing segments and operative components providing the fluid flow passageway through the fluid circuit; wherein each tubing segment comprises i) a non-conductive polymer portion defining the fluid passageway and ii) an one or more interior conductive stripes of conductive fluoropolymer that is bonded to and uniform with the non-conductive polymer portion extending axially to ends of each of the respective tubing segments, wherein each body portion comprises an conductive fluoropolymer that extends between each of the plurality of tubing connector fittings, and wherein each of the tubing connector fittings conductively connects the respective conductor of the body portion to the at least one interior conductive fluoropolymer stripe of the tubing segment, and connecting the electrostatic discharge mitigation fluid circuit to ground.

In various embodiments, to provide a conductive pathway and fluid passageway through the fluid circuit, the operative components are connected by one or more tubing segments that connect to the components at their respective tubing connector fittings. Suitable operative components include, for example, valves, straight connectors, T-connectors, elbow connectors, multi-connector manifolds, filters, heat exchangers, or sensors. Suitable sensors may include, for example, flow controllers, regulators, flow meters, pressure meters, or variable area meters. In one or more embodiments, the body portion of the operative components may be bonded to and uniform with a conductive portion extending between the connector fittings and the fluid flow passageway.

In certain embodiments, the plurality of tubing segments each include a non-conductive polymer portion and one or more interior conductive fluoropolymer stripes extending axially with the non-conductive polymer tubing portion. The stripes of conductive fluoropolymer of the tubing segment conductively connect to the conductive pathway of the body portion at the tubing connector fittings.

In one or more embodiments, each of the tubing connector fittings conductively connects the conductive pathway of the body portion to the stripes of conductive fluoropolymer of the tubing portion connected to the respective tubing connector fitting.

The above summary is not intended to describe each illustrated embodiment or every implementation of the present disclosure.

BRIEF DESCRIPTION OF THE DRAWINGS

The drawings included in this disclosure illustrate embodiments of the present disclosure and, along with the description, serve to explain the principles of the disclosure. The drawings are only illustrative of certain embodiments and do not limit the disclosure.

FIG. 5b depicts a cross-sectional view taken at section line 5-1 of FIG. 5a.

FIG. 5c depicts a cross-sectional view of an alternative embodiment taken at section line 5-1 of FIG. 5a.

FIGS. 5d and 5e depict cross-sectional views of alternative embodiments taken at section line 5-1 of FIG. 5a.

FIGS. 8a-8d depict isometric views of alternative embodiments of tubing segments of this disclosure.

Figure 1:
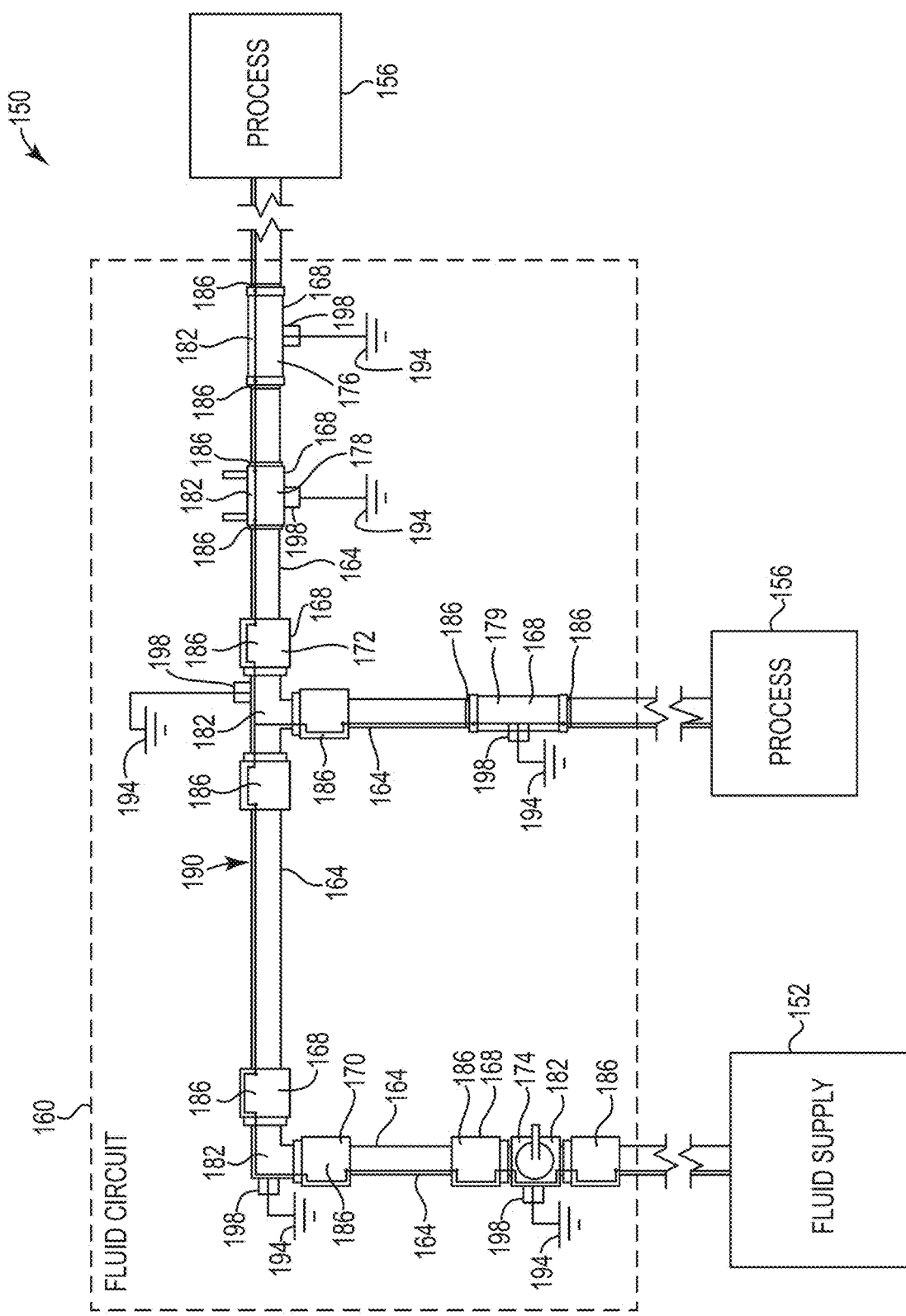
FIG. 1 depicts a fluid handling system and fluid circuit, according to one or more embodiments of this disclosure.

The embodiments of this disclosure are amenable to various modifications and alternative forms, and certain specifics have been shown, for example, in the drawings and will be described in detail. It is understood that the intention is not to limit the disclosure to the particular embodiments described; the intention is to cover all modifications, equivalents, and alternatives falling within the spirit and scope of this disclosure.

DETAILED DESCRIPTION

This disclosure reports embodiments of a fluid handling system with ESD mitigation having a fluid flow passageway from a fluid supply to one or more downstream process stages. Embodiments of this system include a fluid circuit including conductively connected operative components and tubing segments. Conventional and some ESD mitigation fluid circuits are reported, for example, in International patent application, WO 2017/210293, which is incorporated herein by reference, except for express definitions or patent claims contained therein. Other ESD mitigation fluid circuits are reported, for example, in an Entegris brochure, FLUOROLINE Electrostatic (ESD) Tubing, 2015-2017.

Operative components in this disclosure refer to any component or device having a fluid input and a fluid output and that connect with tubing for directing or providing for the flow of fluid. Examples of operative components include, but are not limited to, fittings, valves, filters, heat exchanges, sensors, pumps, mixers, spray nozzles, and dispense heads. These and additional non-limiting examples of operative components are illustrated, for example, in U.S. Pat. Nos. 5,672,832; 5,678,435; 5,869,766; 6,412,832; 6,601,879; 6,595,240; 6,612,175; 6,652,008; 6,758,104; 6,789,781; 7,063,304; 7,308,932; 7,383,967; 8,561,855; 8,689,817; and 8,726,935, each of which are incorporated herein by reference, except for express definitions or patent claims contained in the listed documents.

The operative components may be constructed from conductive fluoropolymers including, for example, perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), tetrafluoroethylene p[polymer PTFE), or other suitable polymeric materials. For example, in some embodiments the conductive fluoropolymers are PFA loaded with conductive material (e.g. loaded PFA). This loaded PFA includes, but is not limited to, PFA loaded with carbon fiber, nickel coated graphite, carbon fiber, carbon powder, carbon nanotubes, metal particles, and steel fiber. In various embodiments, conductive materials have a surface resistivity level less than about $1 \times 10^8$ ohms per square while non-conductive materials have a surface resistivity level greater than about $1 \times 10^{10}$ ohms per square. In certain embodiments, conductive materials have a surface resistivity level less than about $1 \times 10^9$ ohms per square while non-conductive materials have a surface resistivity level greater than about $1 \times 10^9$ ohms per square. When the disclosed fluid handling systems are configured for use in ultra-pure fluid handling applications, both the tubing segments and operational components are typically constructed from polymeric materials to satisfy purity and corrosion resistance standards.

Tubing segments in this disclosure typically refer to any flexible or inflexible pipe or tube that is suitable for containing or transporting fluid. Tubing segments are conductive, providing a conductive pathway along the length of each tubing segment in the fluid circuit. Conductive tubing may be constructed from materials including metal or loaded polymeric material. Loaded polymeric material includes a polymer that is loaded with steel wire, aluminum flakes, nickel coated graphite, carbon fiber, carbon powder, carbon nanotubes, or other conductive material. In some instances, the tubing segments are partially conductive, having a main portion constructed from non-conductive or low conductive material, such as constructed from various hydrocarbon and non-hydrocarbon polymers such as, but are not limited to, polyesters, polycarbonates, polyamides, polyimides, polyurethanes, polyolefins, polystyrenes, polyesters, polycarbonates, polyketones, polyureas, polyvinyl resins, polyacrylates, polymethylacrylates and fluoropolymers. Exemplary fluoropolymers include, but are not limited to, perfluoroalkoxy alkane polymer (PFA), ethylene tetrafluoroethylene polymer (ETFE), ethylene, tetrafluoroethylene and hexafluoropropylene polymer (EFEP), fluorinated ethylene propylene polymer (FEP), and tetrafluoroethylene polymer (PTFE), or other suitable polymeric materials, and having, for example, a secondary co-extruded conductive portion. In certain embodiments the interior fluoropolymer conductive stripe of the tubing segments has a width in the range of about 0.1-1 centimeter. In selected embodiments each tubing segment has a length in a range of about 1-100 feet. In other selected embodiments, the tubing segment has an outside diameter of about ⅛ inch to about 2 inches. In other embodiments the tubing segments have a measured resistance of about $1.2 \times 10^4$-$6.7 \times 10^5$ ohm. In still other embodiments the tubing segments have a measured resistance of about $2.5$-$4.3 \times 10^4$ ohm.

FIG. 1 depicts a fluid handling system 150 according to one or more embodiments of the disclosure. The system 150 provides a flow path for fluid to flow from a fluid supply 152 to one or more process stages 156 positioned downstream of the source of fluid supply. System 150 includes a fluid circuit 160 which includes a portion of the flow path of the fluid handling system 150. The fluid circuit 160 includes tubing segments 164 and a plurality of operative components 168 that are interconnected via the tubing segments 164. In FIG. 1, the operative components 168 include an elbow shaped fitting 170, T-shaped fitting 172, a valve 174, filter 176, flow sensor 178, and straight fitting 179. However, in various embodiments the fluid circuit 160 can include additional or fewer operative components 168 in number and in type. For example, the fluid circuit 160 could substitute or additionally include pumps, mixers, dispense heads, sprayer nozzles, pressure regulators, flow controllers, or other types of operational components. In assembly, the operative components 168 are connected together by the plurality of tubing segments 164 connecting to the components 168 at their respective tubing connector fittings 186. Connected together, the plurality of tubing segments 164 and operative components 168 provide a fluid passageway through the fluid circuit 160 from the fluid supply 152 and toward the process stages 156. In certain embodiments, the operational components 168 each include a body portion 182 that defines fluid flow passageway and one or more tubing connector fittings 186. In some embodiments, at least one of the tubing connector fittings 186 is an inlet portion for receiving fluid into the body portion 182 and at least another one of the tubing connector fittings 186 is an outlet portion for outputting fluid received via the inlet portion. For example, T-shaped fitting 172 includes one tubing connector fitting 186 that is an inlet portion that receives fluid from the fluid supply 152 and two tubing connector fittings 186 which are outlet portions outputting fluid toward the process stages 156. In certain embodiments, the inlet portion and the outlet portion are each connected or connectable to a tubing segment 164. However, in some embodiments, for example where the operative components 168 in the fluid circuit 160 includes a spray nozzle, only the inlet portion is required to be connectable to a tubing segment 164. In some embodiments one or more of the operative components 168 includes a single tubing connector or fitting 179.

As illustrated in FIG. 1, each body portion 182 is additionally constructed using a conductive material to form a conductor portion that extends between and provides a conductive pathway between each of the tubing connector fittings 186. In various embodiments, the conductive pathway is bonded to and uniform with the body portion 182 and is constructed from a conductive polymeric material. For example, in some embodiments the conductor portion is constructed from PFA loaded with conductive material. This loaded PFA includes, but is not limited to, PFA loaded with carbon fiber, nickel coated graphite, carbon fiber, carbon powder, carbon nanotubes, metal particles, and steel fiber.

Figure 2:
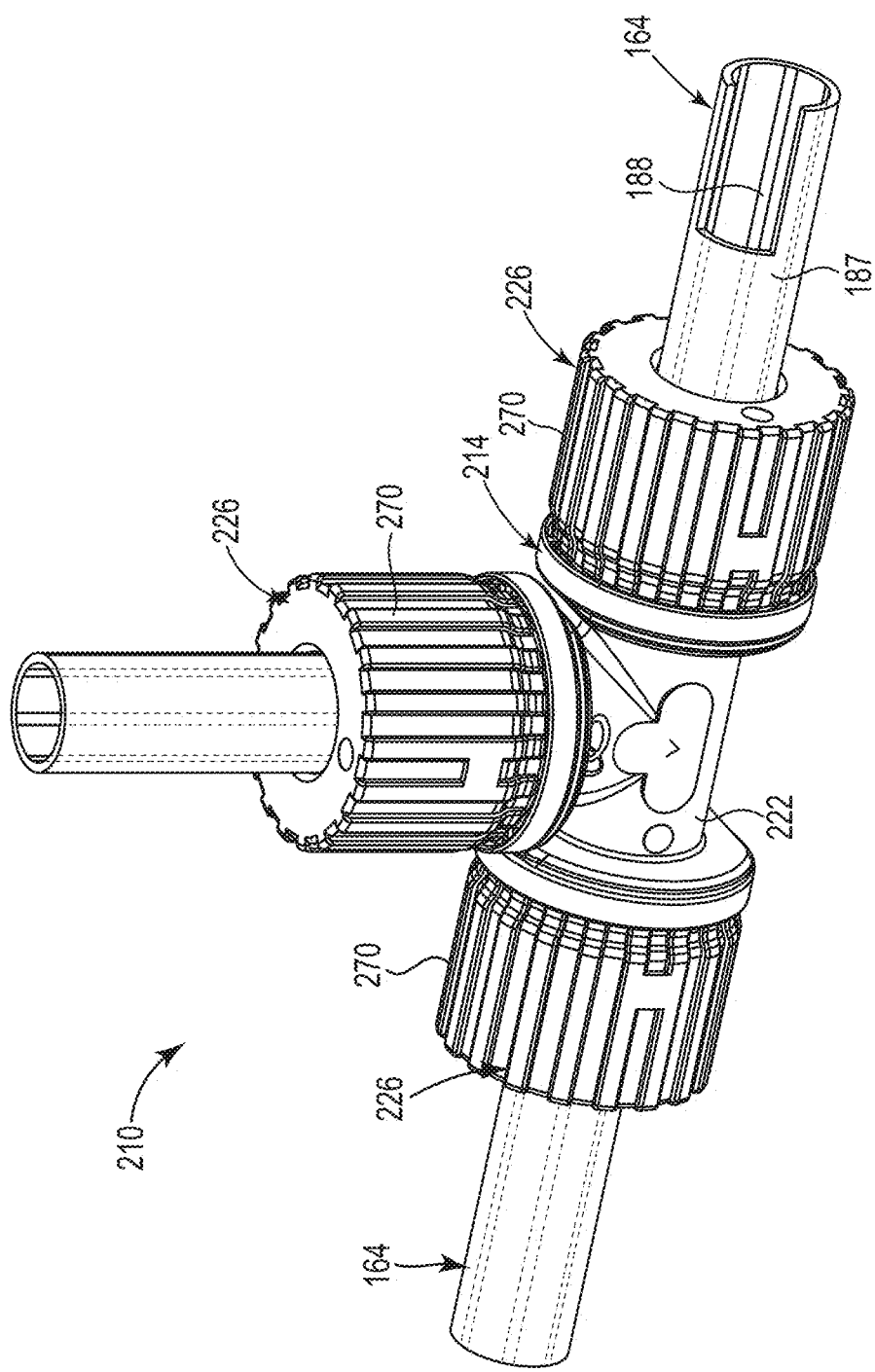
FIG. 2 depicts an operative component and connected tubing segments, according to one or more embodiments of this disclosure.
Figure 3:
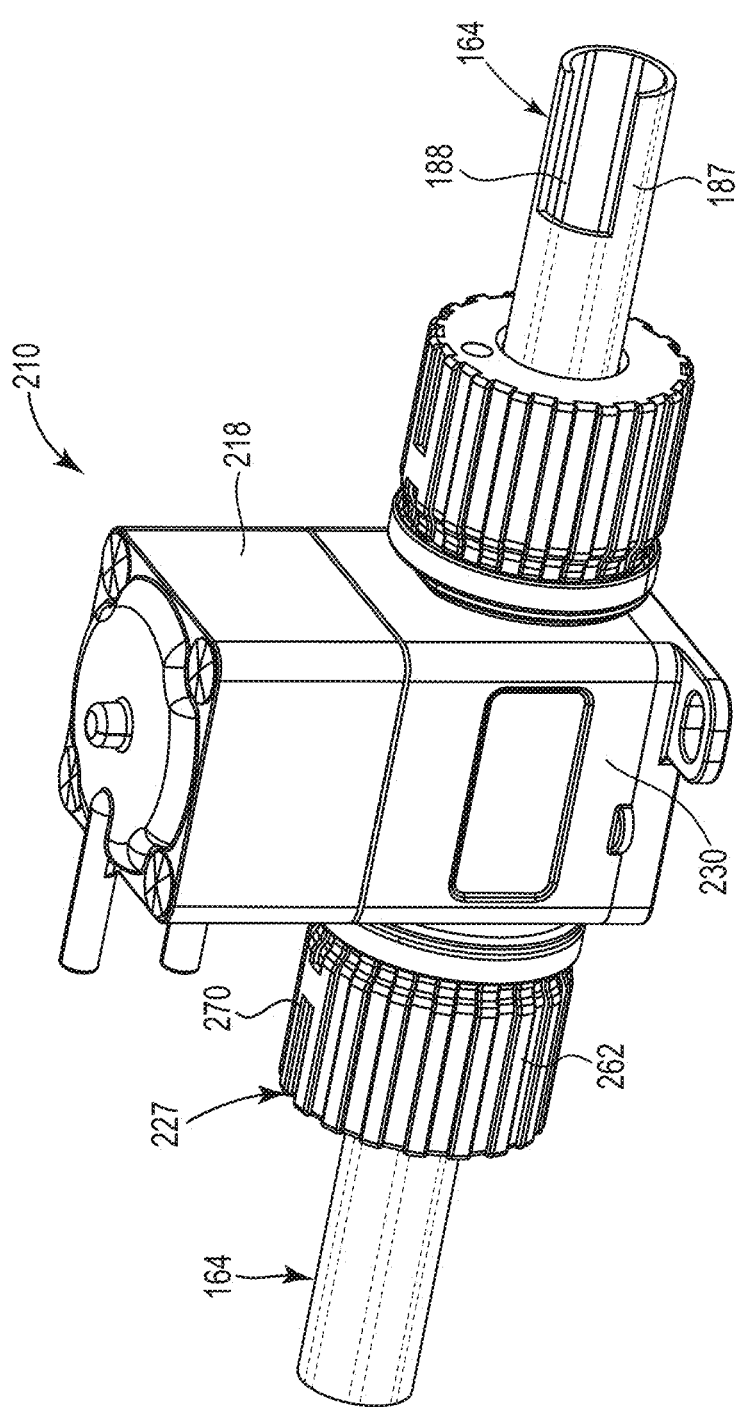
FIG. 3 depicts an operative component, a tubing connector fitting and fitting nut and tubing segment, according to one or more embodiments of this disclosure.

As illustrated in FIGS. 2 and 3, tubing segments 164 are partially conductive, having a main portion or tubing portion 187 constructed from non-conductive or low conductive polymeric material and having a secondary portion or conductive portion 188 (indicated by dashed lines) constructed from a conductive material that extends axially along the interior length of the tubing portion 187. For example, in some embodiments, tubing segments 164 each include a tubing portion 187 of a non-conductive fluoropolymer and conductive portion 188 formed as a stripe of conductive polymer extending axially on and bonded to a uniform with the non-conductive fluoropolymer main portion 187. In certain embodiments, tubing portions are constructed from PFA with the one or more conductive stripes 187 of the secondary portion constructed from carbon-loaded PFA that is extruded along the interior length of each of the tubing segments 164 at or near its interior surface.

Each of the operative components 168, as illustrated in FIG. 1, includes a bridging component for conductively connecting the respective conductive pathway of the body portion 182 to the conductive portion 187 of the tubing segments 164 (shown in FIGS. 2 and 3) that are connected to the operative components 168. As such, in certain embodiments the connected operative components 168 and tubing segments 164 form an electrical pathway along the entirety of the fluid circuit 160, eliminating breaks in conductivity between the tubing segments 160. A circuit diagram 190 is superimposed over the fluid circuit 160 to illustrate the electrical pathway. In various embodiments, conductive materials have a surface resistivity level less than about $1 \times 10^{10}$ ohms per square, while non-conductive materials have a surface resistivity level greater than about $1 \times 10^{10}$ ohms per square. In certain embodiments, conductive materials have a surface resistivity level less than about $1 \times 10^9$ ohms per square, while non-conductive materials have a surface resistivity level greater than about $1 \times 10^9$ ohms per square.

In certain embodiments, to mitigate static charge buildup, one or more of the operative components 168 are electrically connected to ground 194 via one or more attachment fixtures 198. The ground attachment fixtures 198 continuously disperse static charges as they build up in the fluid circuit 160 by providing a pathway to ground 194 from the conductive pathway 190.

FIGS. 2 and 3 depict examples of operative components 210 according to one or more embodiments of this disclosure. FIG. 2 depicts an operative component 210 that is a fitting 214, and, more specifically, is a three way connector having a "T" shape (e.g. a T-shaped fitting). FIG. 3 depicts a valve 218. The T-shaped fitting 214 includes a conductive body portion 222 and three connector fittings 226 extending outwardly from the body portion 222. In certain embodiments the exterior surface of the connector fittings includes a structure surface 270. The valve 218 includes a conductive body portion 230 and two connector fittings 227 extending outwardly from the body portion 230. In certain embodiments the exterior surface of the connector fittings includes a structure surface 270.

In various embodiments, connector fittings 226 and 227 are substantially the same design. As described above, in various embodiments the body portion 222, 230 is constructed using a conductive polymeric material. For example, the body portion 222 or 230 can be constructed from conductive carbon-loaded fluoropolymers including, but not limited to, PFA, ETFE, FEP, and PTFE.

Figure 4A:
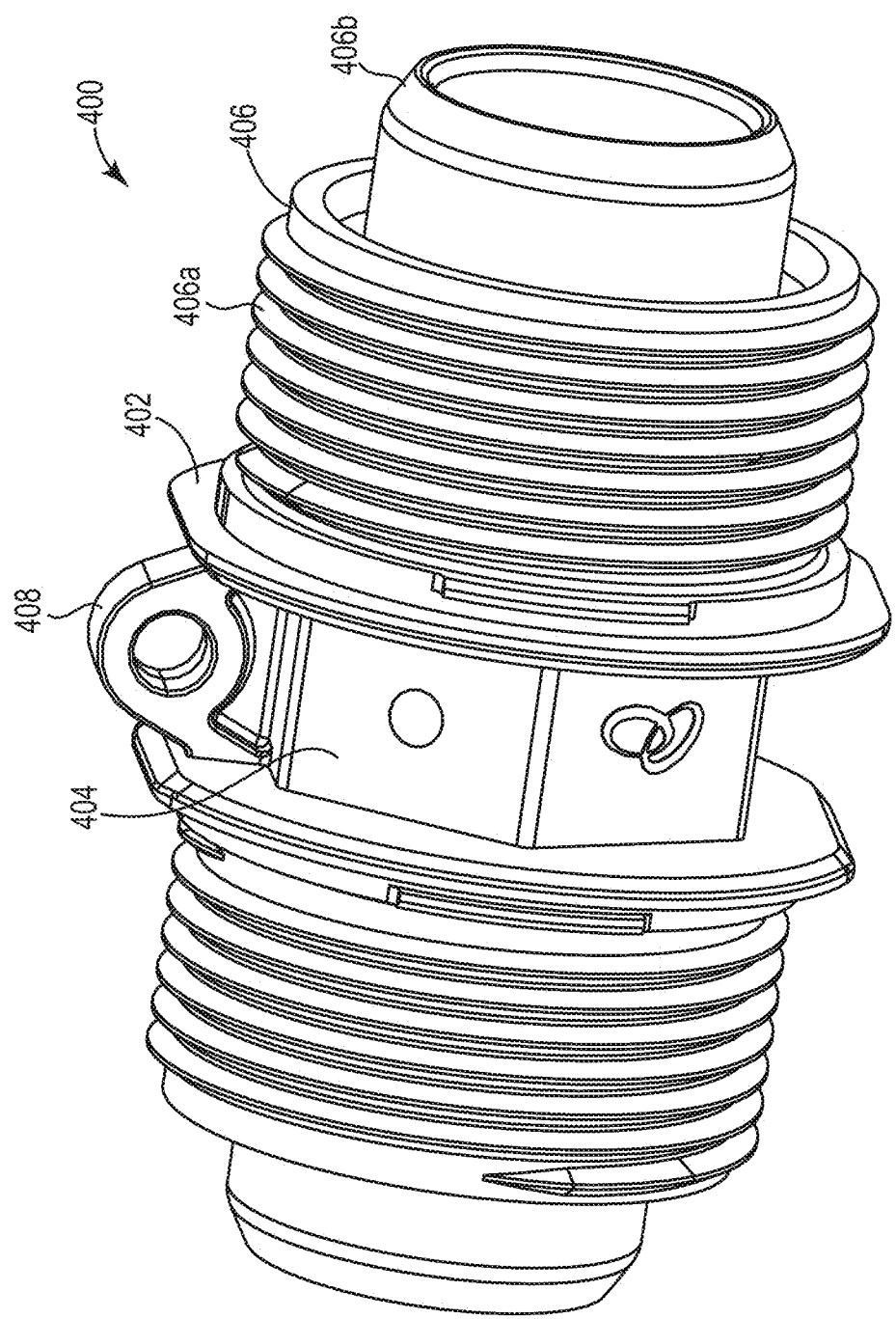
FIGS. 4a and 4b depict side and partial cross sectional views of an operative component having a tubing connector fitting (FIG. 4a) and a tubing segment (FIG. 4b), according to one or more embodiments of this disclosure.

FIG. 4a illustrates a straight connector fitting 400 to connect two tubing segments. Connector fitting 400 includes a shoulder region 402 adjacent a body portion 404 of an operative component and extends outwardly to form a neck region 406, a threaded region 406a, and a nipple portion 406b. Tubing segment 164 is received by the nipple portion 406b, which, in certain embodiments, may be configured, for example, as a FLARETEK® fitting. Connector fitting 400 also includes an attachment feature 408 that is a conductive material that is conductively connected with the body portion 504 for attachment to an external electrical contact and then to ground. For example, attachment feature 408 can be connected to an electrical contact which is grounded in order to configure the operative component connector fitting 400 for ESD mitigation.

Figure 4B:
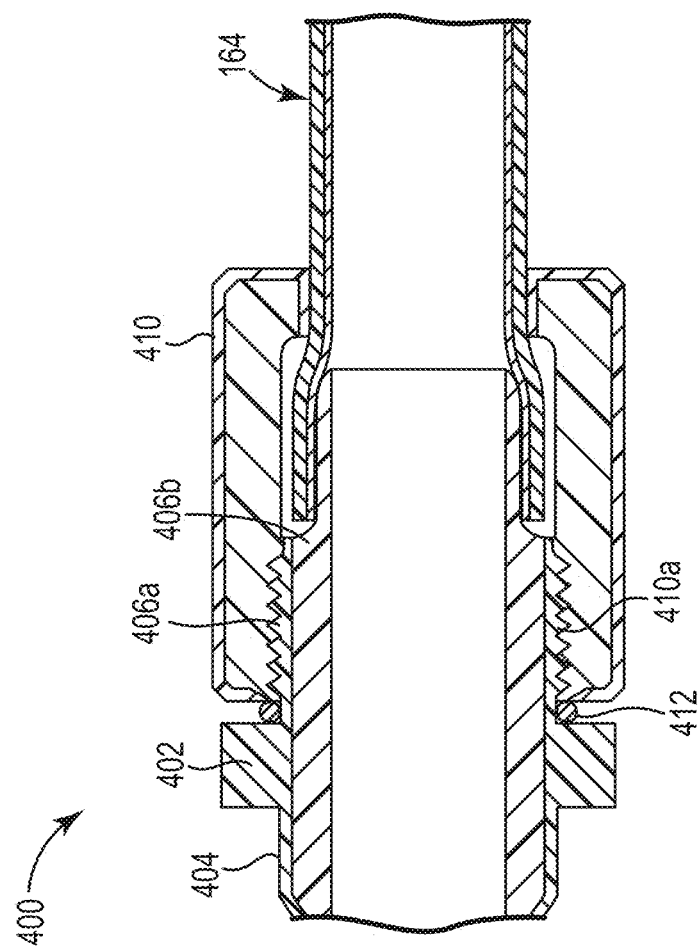

In the embodiment illustrated in FIG. 4b, connector fitting 400 includes a connector fitting nut 410 for engaging to the threaded region 406a to secure tubing segment 164. In some embodiments the fitting nut may be, for example, a compression nut. As the fitting nut 410 is rotated and tightened onto the threaded region 406a, tubing segment 164 engages the connector fitting so that the interior conductive stripes conductively connected the conductive portion to nipple portion 406b, as well as forming a leak-proof seal between the tubing and the connector fitting. In one or more embodiments, fitting nut 410 has a generally cylindrical shape having an interior surface including threads 410a for mating with threaded region 406a. In addition, fitting nut 410 may have a structured outer surface such as, for example, ribs 270 illustrated in FIGS. 2 and 3, where the ribs are symmetrically disposed about the exterior surface for mating with a wrench or locking device for tightening or loosening of the fitting nut 410 on the threaded region 406a.

In one or more embodiments, the fitting nut 410 is constructed from a polymeric material. For example, in certain embodiments the fitting nut 410 is constructed from PFA, polyaniline, or other suitable polymer.

In some embodiments, the connector fitting 400 is a conductive polymer material, such as carbon-loaded PFA, or other suitable conductive polymer, that is formed, for example, using conventional molding processes.

In certain embodiments, when the connector fitting 400 is assembled with tubing segment 164, the fitting nut 410 contacts the exterior surface of tubing segment 164 at the nipple forward portion 406b and forms a continuous fluid passageway between tubing segment 164 and connector fitting 400. When the fitting nut 410 is rotated and tightened, O-ring 412 positioned between the fitting nut 410 and the shoulder portion 402 contacts both the exterior surfaces of the fitting nut and shoulder portion to provide a leak-proof connection.

In various embodiments, the O-ring 360 is constructed from polymeric material, such as PFA, or other polymers or elastomers.

Those of skill in the art will appreciate that, while the specific embodiments illustrated in FIGS. 2, 3 and 4 have identical connector fittings, in certain embodiments, the connector fittings may have varying sizes, may have various designs, such as step-down or step-up fittings, or may be located on various types of operative components 210.

FIGS. 5a-5e illustrate several embodiments of an operative component 500. Operative component 500 includes a body portion 504, tubing connector fittings 520, and fitting nuts 508. In one or more embodiments, the operative component 500 additionally includes an operative element 506 in the body portion. The operative element 506, in various embodiments, broadly includes suitable structure, electronics, or other materials for configuring the operative component 500 to perform various operations. For example, in some embodiments, the operational element 506 is a mixer, sensor, filter, pump, heat exchanger or other suitable element. As such, the operative component 500 is configurable to perform various processes or tasks within a fluid circuit.

The body portion 504 includes conductive PFA that extends between each of the tubing connector fittings 520 and forms electrical contact between each of the tubing connector fittings 520 and the interior conductive stripes of tubing segments 522a and 522b, respectively. Depicted in FIGS. 5b and 5c, in one or more embodiments, the conductive portions of the tubing segments are narrow interior stripes of conductive material that is bonded to and uniform with the non-conductive polymer material of the tubing segments. FIG. 5b illustrates a tubing segment with four interior conductive stripes 524a-524d. In another embodiment, 5c illustrates a tubing segment with eight interior conductive stripes 524a-524h. In still other embodiments, FIG. 5d illustrates a tubing segment with eight interior conductive stripes 524a-524h, and two exterior conductive stripes 526a and 526b. In a similarly construction of a tubing segment with interior and exterior stripes, FIG. 5e illustrates a tubing segment with eight interior conductive stripes 524a-524hg, and two exterior conductive stripes 526a and 526b.

As described above, in various embodiments the operative component 500 is connected with tubing segments 522a and 522b at each of the connector fittings 508. The connector fittings 508 form an electrical pathway from conductive portions 522a and 522b of the tubing segments through the connector portions 508 and across the body portion 504.

Figure 5A:
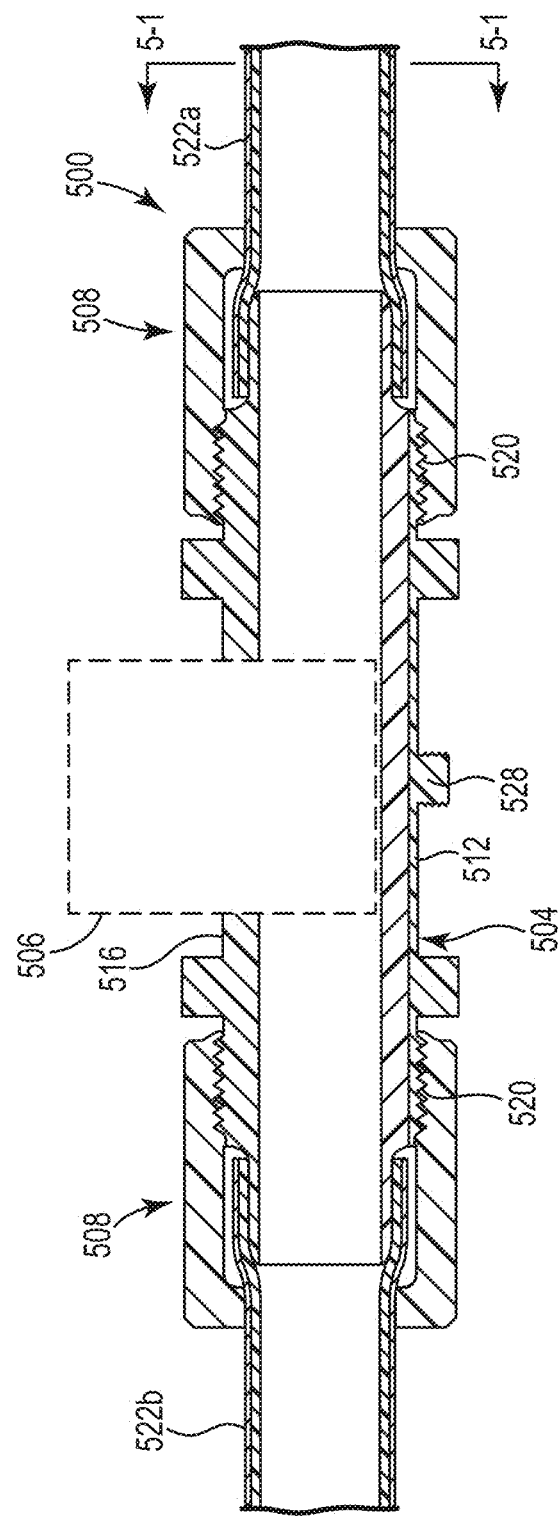
FIG. 5a depicts a cross-sectional view of an operative component, according to one or more embodiments of this disclosure.
Figure 5C:
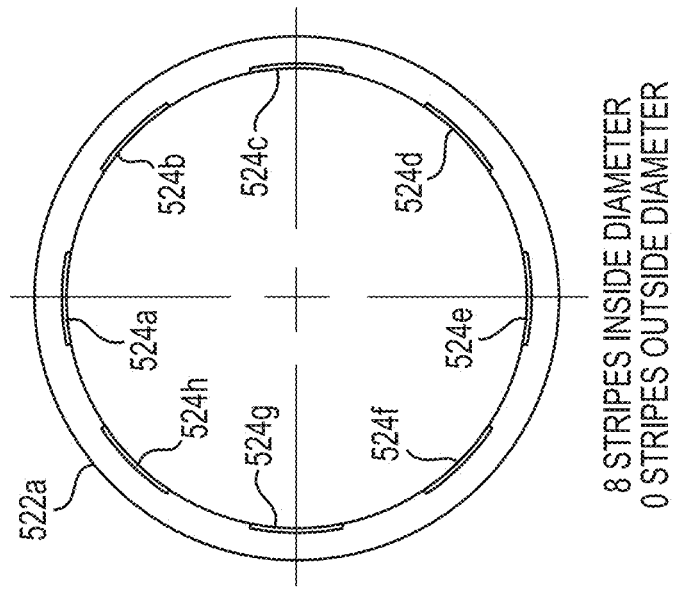
Figure 5B:
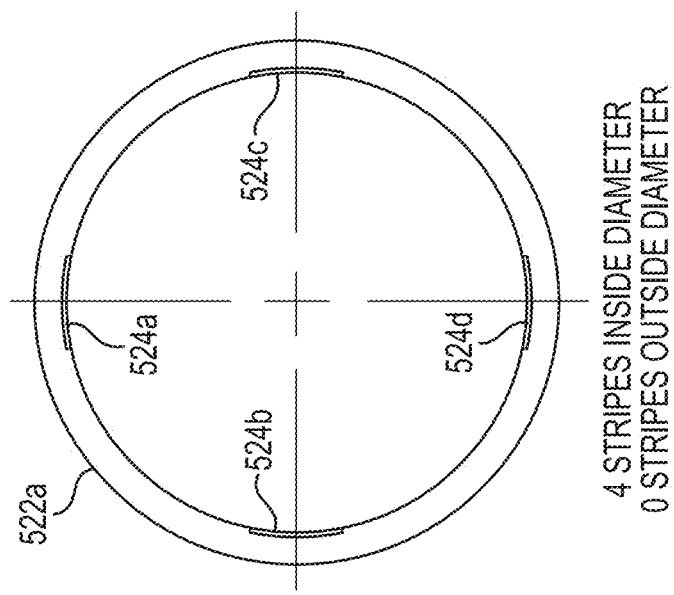

In various embodiments, illustrated in FIG. 5a, the body portion 504 includes an attachment feature 528. In one or more embodiments, the attachment feature 528 is a piece of conductive material that is conductively connected with the body portion 504 for attachment to an external electrical contact and then to ground. For example, attachment feature 528 can be connected to an electrical contact which is grounded in order to configure the operative component 500 for ESD mitigation. In one or more embodiments, the attachment feature 528 is a connector boss which is threaded for attachment to a nut or other threaded connector. In some embodiments, the attachment feature 528 is a tab, a threaded hole, or other suitable feature for connecting to an electrical contact. However, in certain embodiments, the attachment feature 528 can be configured for interference fit, snap fit, friction fit, or other methods of fitting with an electrical contact.

Figure 6B:
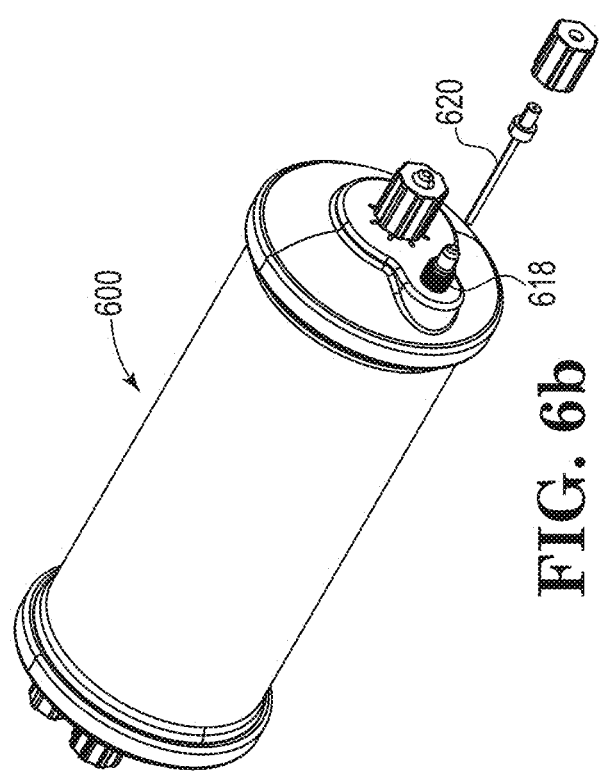
FIG. 6b depicts an isometric view of a filter having two end caps, according to one or more embodiments of this disclosure.
Figure 6A:
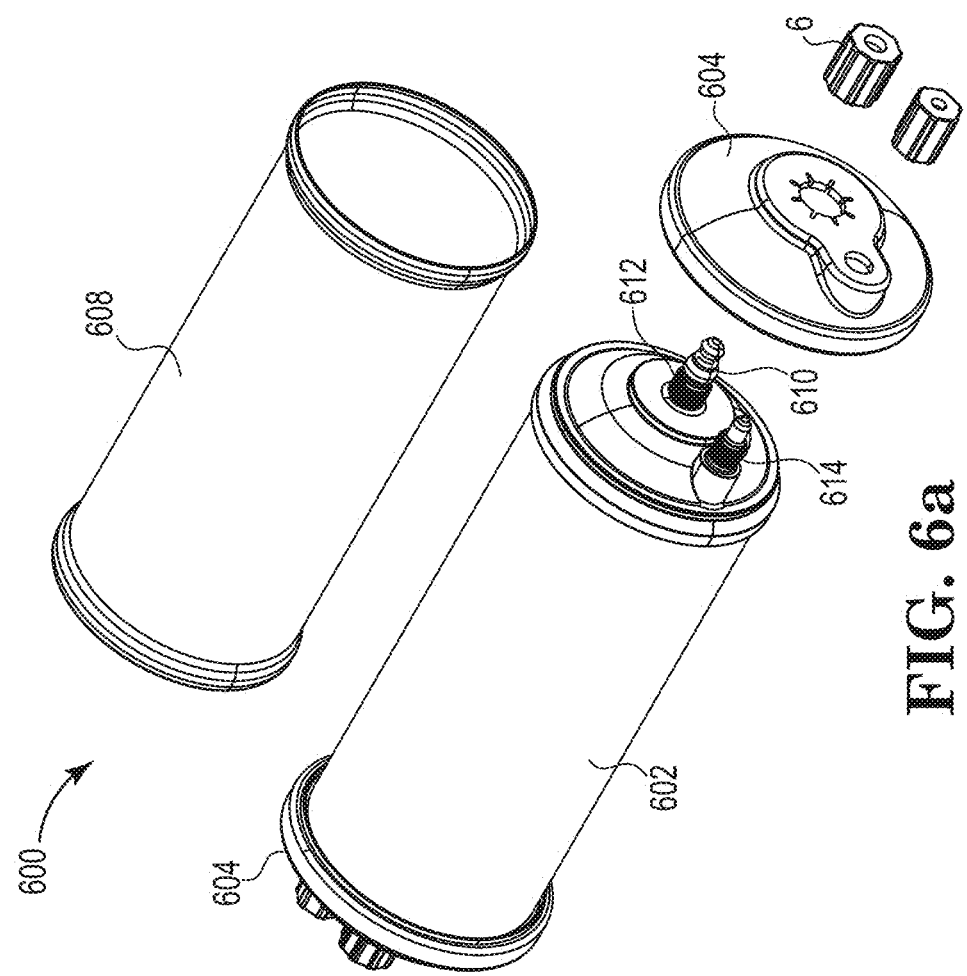
FIG. 6a depicts an exploded isometric view of a filter having two end caps, according to one or more embodiments of this disclosure.

FIG. 6a illustrates one embodiment of an operative component that is a filter. This isometric view of a filter 600 includes a housing 602, two conductive end caps 604 and 606, and outer conductive sleeve 608. Housing 602 includes an interior filter element (not shown) that in some embodiments is a replaceable component; while in other embodiments is a fixed, non-replaceable component. In various embodiments, housing 602 may be a polymeric material and in other embodiments may be a conductive polymer such as, for example a conductive, carbon-loaded PFA as describe above. Both conductive end caps 604, 606 may be conductive materials such as, for example, conductive, carbon-loaded PFA. Each end cap 604, 606 includes fittings for connecting the end caps to housing 602. In some embodiments the connection may be removable, while in other embodiments the connection may be fixed or permanent. In addition, each end cap 604, 606 include one or more connector fittings to connect each end cap to tubing segments (also not shown), described above, in order to provide both a connective pathway and a fluid passageway from a tubing segment through one end cap and housing to another end cap and tubing segment. In certain embodiments, the connector fitting includes, for example, a nipple portion 610, threaded portion, 612, shoulder portion 614 and fitting nut 616, as described above, to provide a conductive connection as well as a leak-proof passageway from tubing segments and filter 600. Further, the connector fitting may include an O-Ring (not shown). Conductive sleeve 608 extends over the exterior surface of both the housing 602 and conductive end caps 604, 606. The sleeve 608 is a conductive polymer material such as, for example, carbon-loaded PFA that provides a conductive connection between the end caps 604, 606. In some embodiments, sleeve 608 is a shrink wrap polymer that may be placed over the exterior of housing 602 and end caps 604, 606 and connected to the exterior surfaces by applying heat to the sleeve using conventional apparatus and process. Optionally, one both of both end caps 604, 606 may include an attachment feature (not shown). In one or more embodiments, the attachment feature is a piece of conductive material that is conductively connected with one or both end caps 604, 606 for attachment to an external electrical contact and then to ground. For example, attachment feature can be connected to an electrical contact which is grounded in order to configure the filter for ESD mitigation. In one or more embodiments, the attachment feature is a connector boss which is threaded for attachment to a nut or other threaded connector. In some embodiments, the attachment feature is a tab, a threaded hole, or other suitable feature for connecting to an electrical contact. However, in certain embodiments, the attachment feature can be configured for interference fit, snap fit, friction fit, or other method of fitting with an electrical contact.

In certain embodiments as illustrated in FIG. 6b, filter 600 includes a drain fitting 618 and drain plug 620. When the drain fitting 618 and/or drain plug is a conductive material, one or both of these components may be connected to ground to provide ESD mitigation.

Figure 7B:
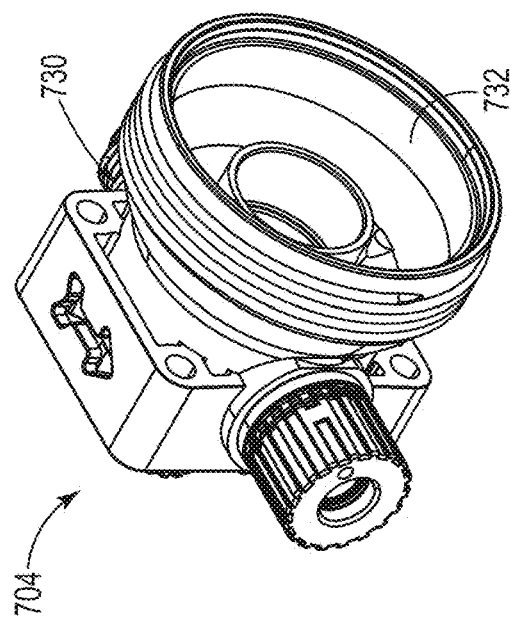
FIG. 7b depicts an isometric view of one end cap, according to one or more embodiments of this disclosure.
Figure 7A:
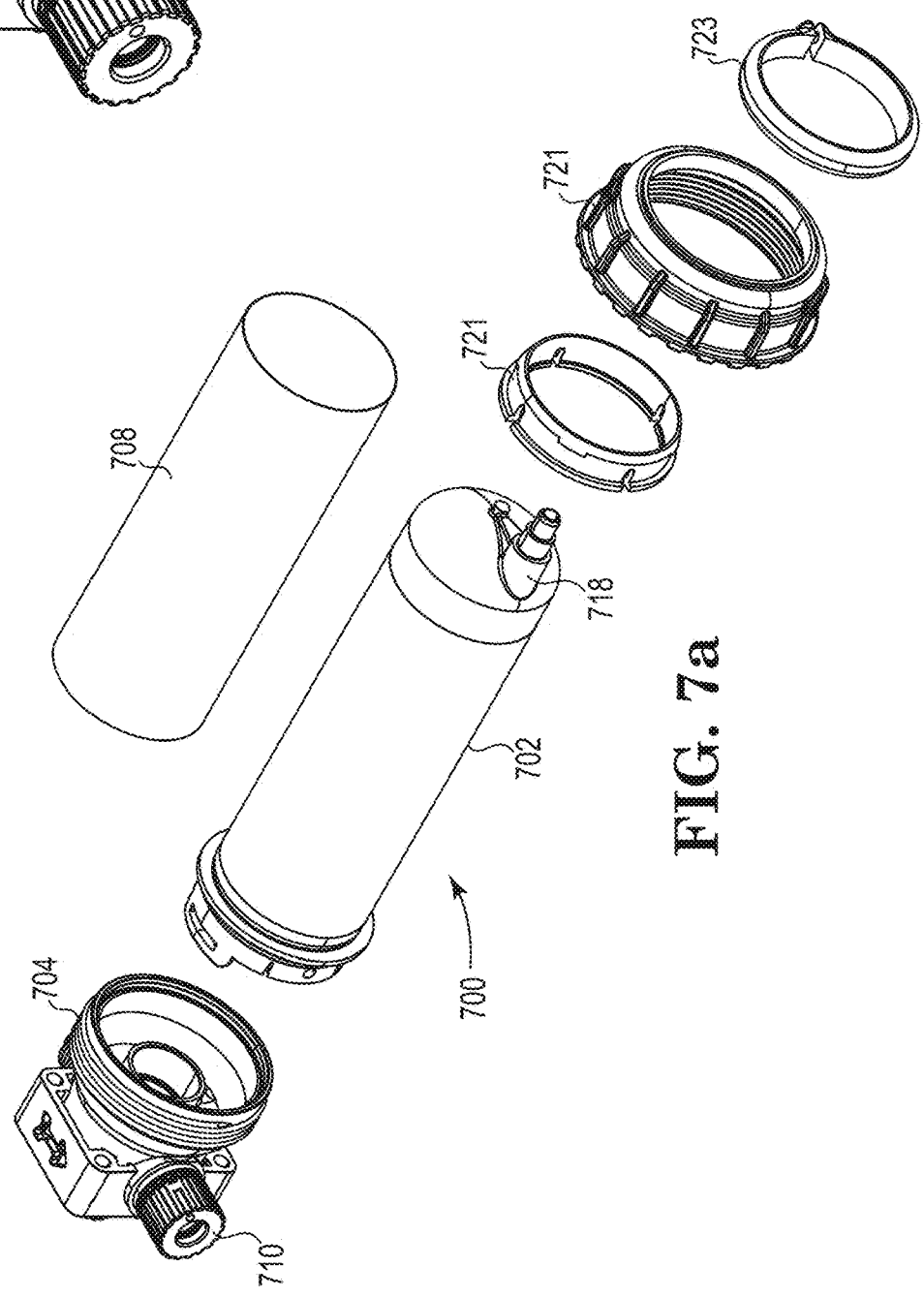
FIG. 7a depicts an exploded isometric view of a filter having one end cap, according to one or more embodiments of this disclosure.

FIG. 7a also illustrates one embodiment of an operative component that is a filter. This isomeric view of a filter 700 includes a housing 702, a conductive end cap 704, and outer conductive sleeve 708. Housing 702 includes an interior filter element (not shown) that in some embodiments is a replaceable component; while in other embodiments is a fixed, non-replaceable component. In various embodiments, housing 702 may be a polymeric material and in other embodiments may be a conductive polymer such as, for example a conductive, carbon-loaded PFA as describe above. Conductive end cap 704 may be a conductive material such as, for example, conductive, carbon-loaded PFA. Conductive end cap 704 includes fittings for connecting the end cap to housing 702. In some embodiments the connection may be removable, while in other embodiments the connection may be fixed or permanent. In addition, end cap 704 includes one or more connector fittings 710 to connect the end cap to tubing segments as described above, in order to provide both connective and fluid passageways from a tubing segment through a conductor fitting through the housing to another conductor fitting and tubing segment. In certain embodiments, the connector fittings include, for example, a nipple portion, threaded portion, shoulder portion, and fitting nut, as described above, to provide conductive connections as well as a leak-proof fluid passageway from tubing segments 164 and filter 700. Further, the connector fitting may include an O ring (not shown). Conductive sleeve 708 extends over the exterior surface of both the housing 702 and conductive end cap 704. The sleeve 708 is a conductive polymer material such as, for example, carbon-loaded PFA that provides a conductive connection between the end cap 704 and the exterior of filter 700. In some embodiments, sleeve 708 is a shrink wrap polymer that may be placed over the exterior of housing 702 and end cap 704 and connected to the exterior surfaces by applying heat to the sleeve using conventional apparatus and process.

Optionally, end cap 704 may include an attachment feature (not shown). In one or more embodiments, the attachment feature is a piece of conductive material that is conductively connected with end cap 704 for attachment to an external electrical contact and then to ground. For example, attachment feature can be connected to an electrical contact which is grounded in order to configure the filter for ESD mitigation. In one or more embodiments, the attachment feature is a connector boss which is threaded for attachment to a nut or other threaded connector. In some embodiments, the attachment feature is a tab, a threaded hole, or other suitable feature for connecting to an electrical contact. However, in certain embodiments, the attachment feature can be configured for interference fit, snap fit, friction fit, or other method of fitting with an electrical contact. In certain embodiments, filter 700 includes a drain fitting 718 and drain plug (not shown). When the drain fitting 718 and/or drain plug is a conductive material, one or both of these components may be connected to ground to provide ESD mitigation. FIG. 7a also illustrates an optional retainer clamp that includes clamping elements 721, 722 and 723.

FIG. 7b illustrates an embodiment of an end cap 704 that includes a conductive polymer portion 730 and a natural polymer portion 732.

Co-Extrusion Process

Figure 8A:
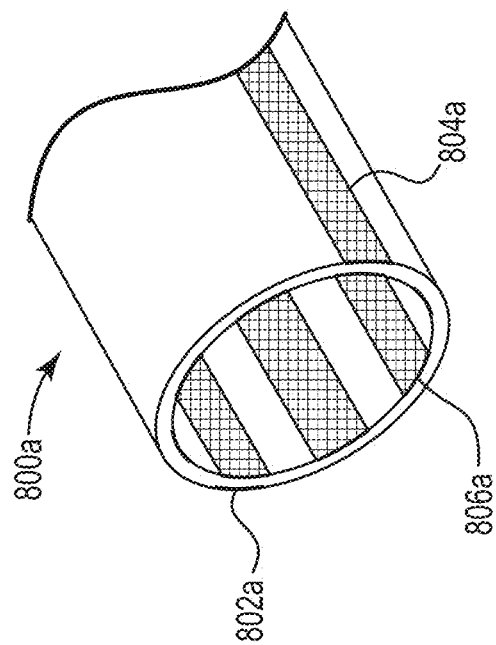

Tubing segments having conductive polymer stripes set out in this disclosure may be made using a variety of co-extrusion process. For example, the tubing segment 800a illustrated in FIG. 8a includes conductive stripes 802a and 804a on the exterior or outside diameter of the tubing segment and conductive stripes 806a on the interior or inside diameter of the tubing segment. In another embodiment, FIG. 8b illustrates tubing segment 800b having conductive stipes 802b on the interior of the tubing segment that are spiral stripes that extend along the axially length of the tubing segment. In another embodiment, FIG. 8c illustrates tubing segment 800c having conductive stipes 802c and 804c on both the exterior and interior of the tubing segment that are spiral stripes that extend along the axially along the length of the tubing segment. In still another embodiment, FIG. 8d illustrates tubing segment 800d having conductive stipes 802d on the exterior of the tubing segment that are spiral stripes that extend along the axially along the length of the tubing segment.

Figure 9:
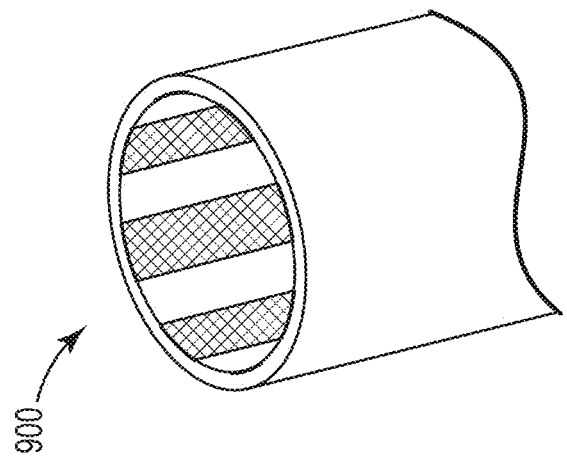
FIG. 9 depicts a digital image of a tubing segment of this disclosure.
Figure 10:
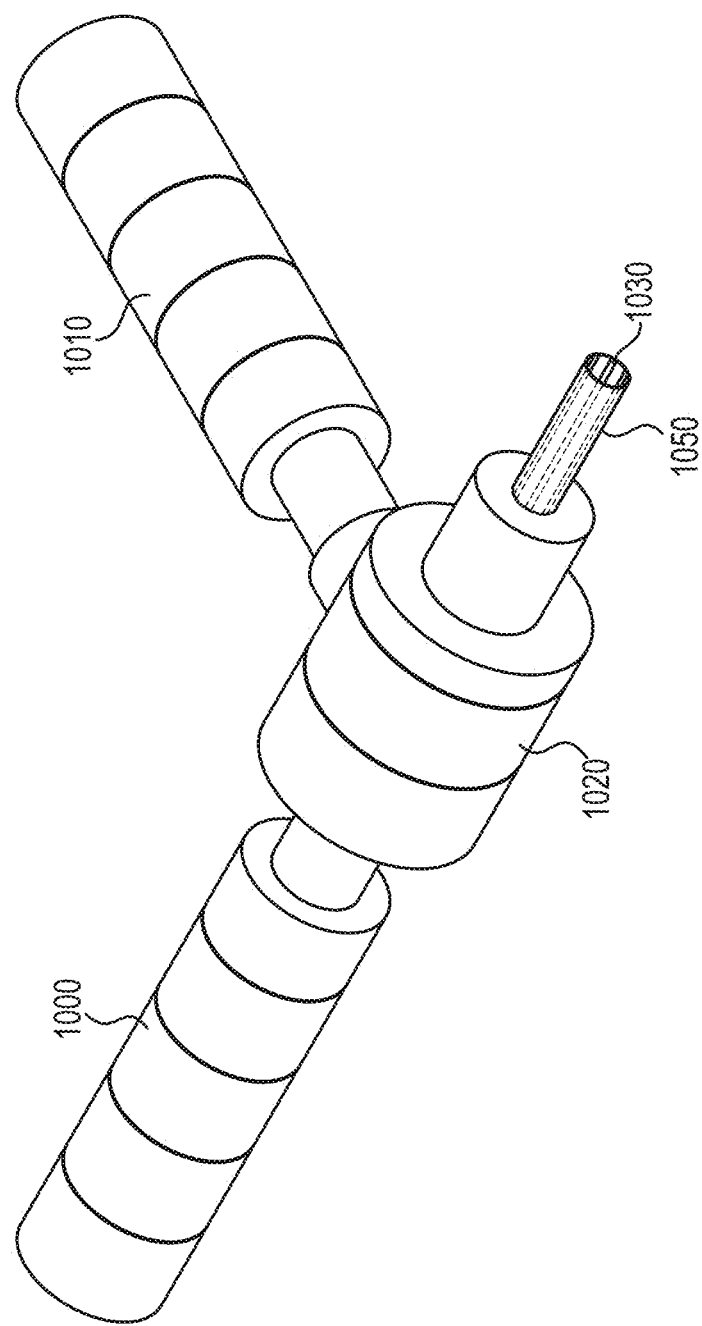
FIG. 10 depicts an extrusion system of this disclosure.

FIG. 9 is a digital image of a tubing segment 900 that includes eight interior stripes, the black stripes in the image, on the interior of the tubing segment. This digital image shows the interior stripes are bonded to and uniform the other portion to the tubing segment. FIG. 10 is a digital image of an extrusion apparatus that provides one or more tubing segments set out in the disclosure. FIG. 10 shows a non-conductive extruded polymer (PFA) feed 1000 and a conductive extruded polymer (PFA/carbon black polymer) feed 1010 that are fed in a perpendicular manner to a tool 1020 that extrude stripes 1030 on the inner diameter of the tubing segment 1050 as well as on both the inner and outer diameters of the tubing segment. Those skilled in the art would readily determine the specific extrusion parameters that would provide the tubing segment having conductive stripes that are bonded to and uniform with the non-conductive portions of the tubing segment.

Example 1 Static Generation Test

This example measured the amount of static electricity generated by flowing deionized water the tubing segments that included the conductive and non-conductive materials set out in Table 1, below. The measurement of static electricity was made using known methods for collecting and measuring generated charge in a Faraday cup.

Figure 11:
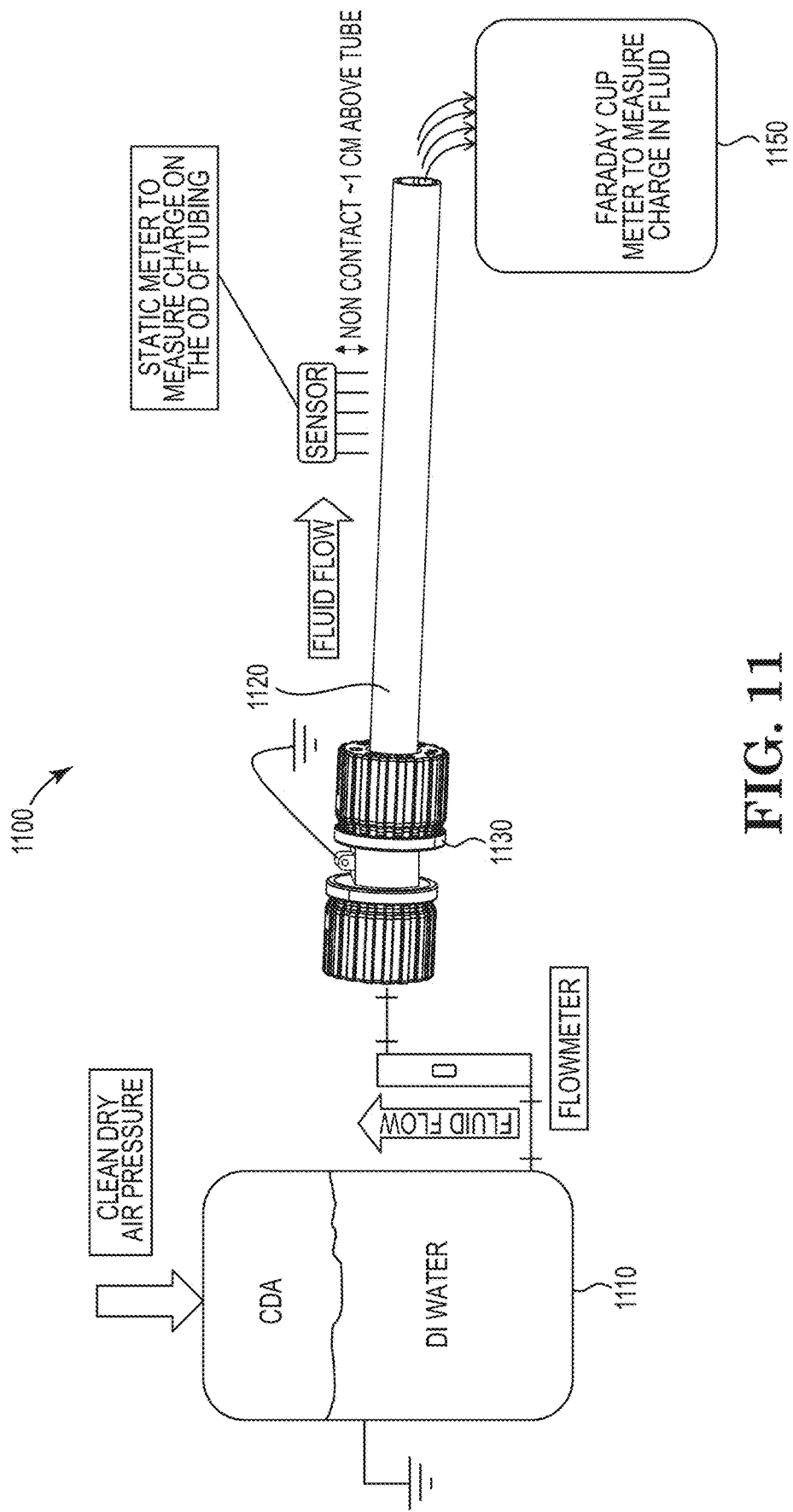
FIG. 11 depicts a Faraday Cup apparatus used to test to ability of different tubing segments to generate static electrical charge.

FIG. 11 is a digital image that shows Faraday cup apparatus 1100 used in this example. Briefly, deionized water 1110 is passed through an operative element 1130 and grounded tubing segment 1120 and then collected in a Faraday cup. The Faraday cup 1150 included a cover that is not show in the image when the data was collected for this example. Exemplary data provided by the imaged data is set out in FIGS. 12-16, below.

Figure 12:
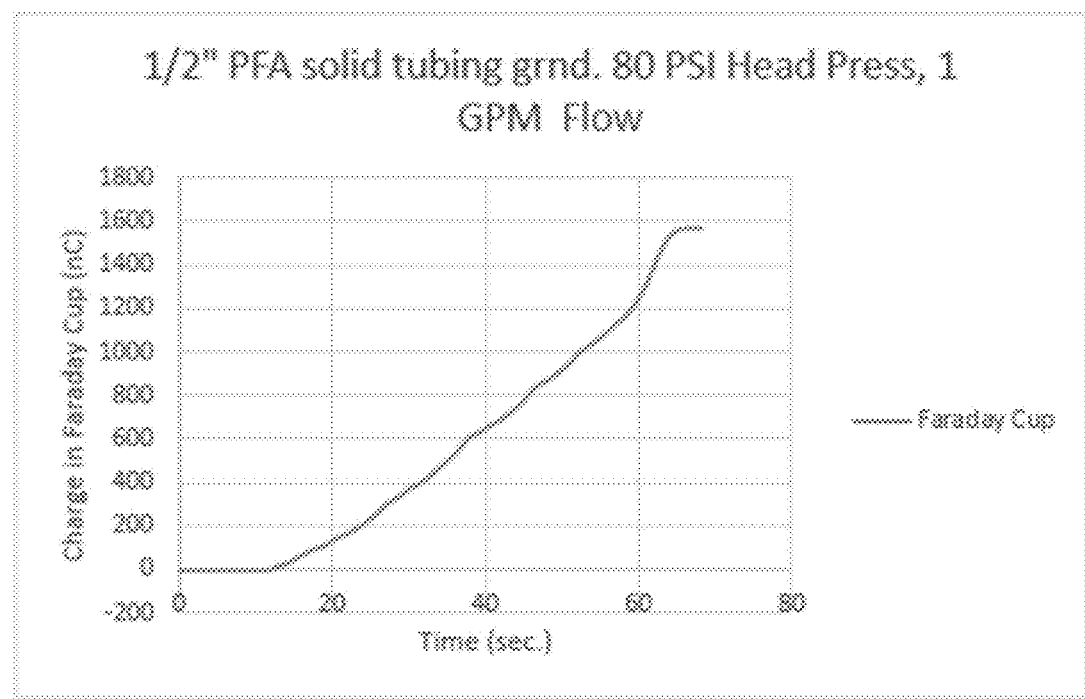
FIGS. 12-13 graphically illustrate the difference in static charge generation between a PFA tubing segment and a stainless steel (SS) tubing segment having the same diameter under the same flow conditions.
Figure 13:
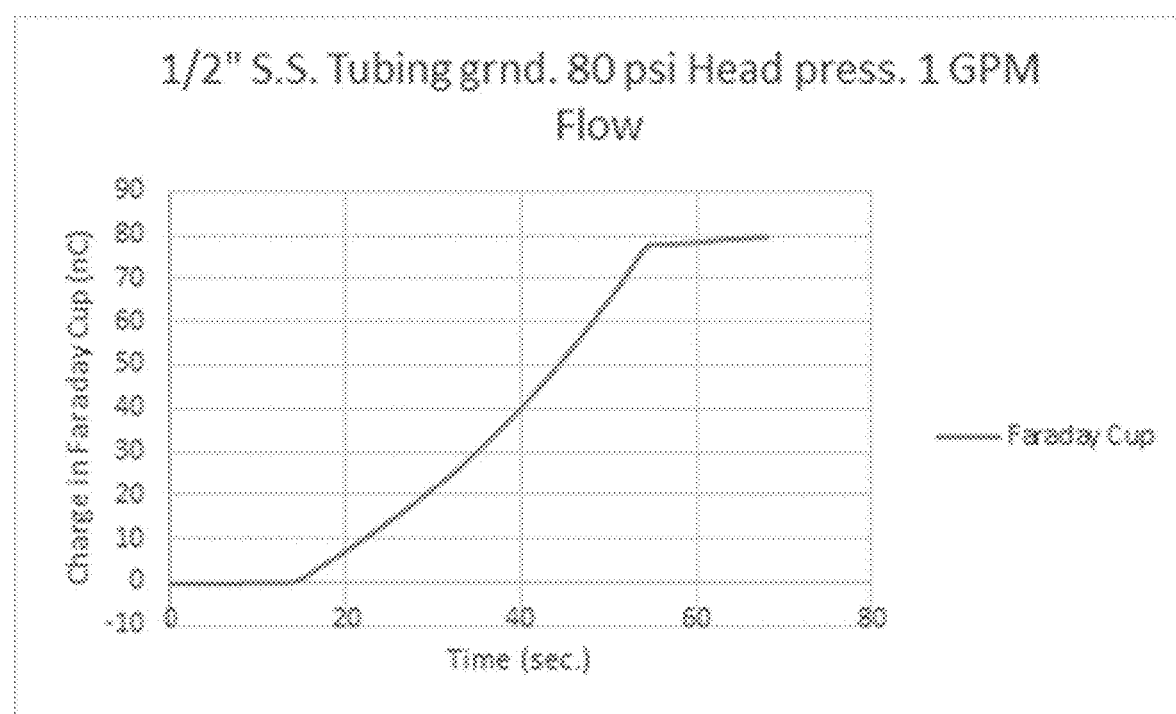

FIGS. 12-13 graphically illustrate the difference in static charge generation between a PFA tubing segment and a stainless steel (SS) tubing segment having the same diameter under the same flow conditions. The PFA tubing segment generated substantially more static charge (about 1600 nC) compared to the static charge generated by the SS tubing segment (about 80 nC).

Figure 14:
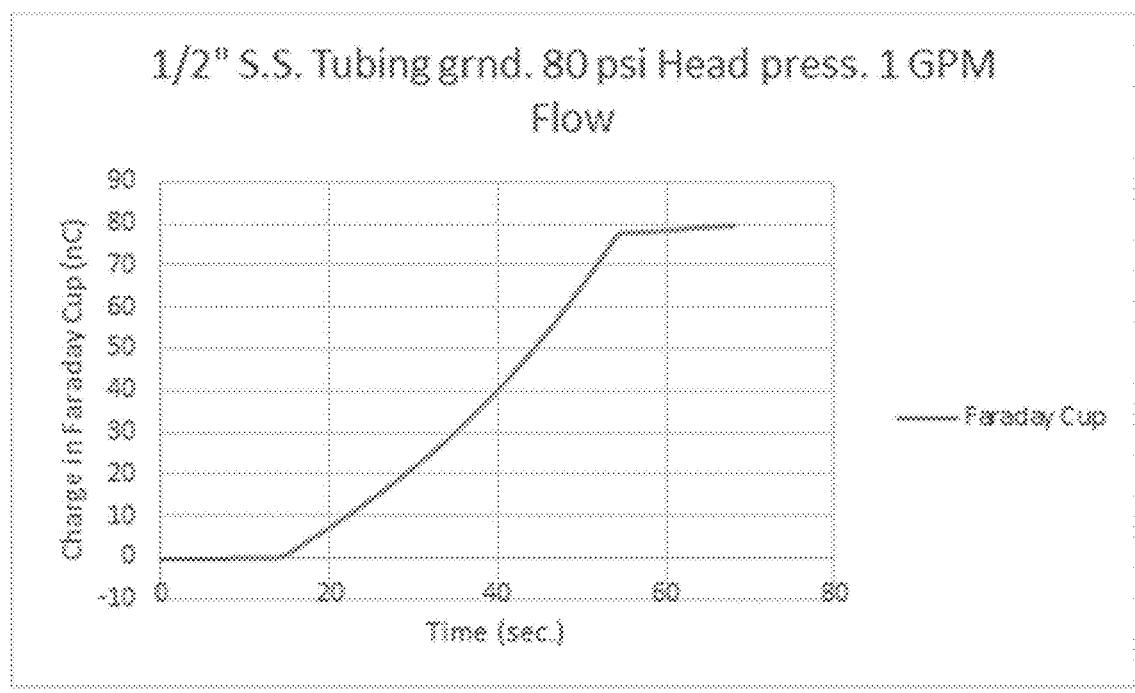
FIGS. 14-15 graphically illustrate the difference in static charge generation between a PFA/inner and outer diameter stripes tubing segment and a PFA/inner diameter stripes tubing segment having the same diameter under the same flow conditions.
Figure 15:
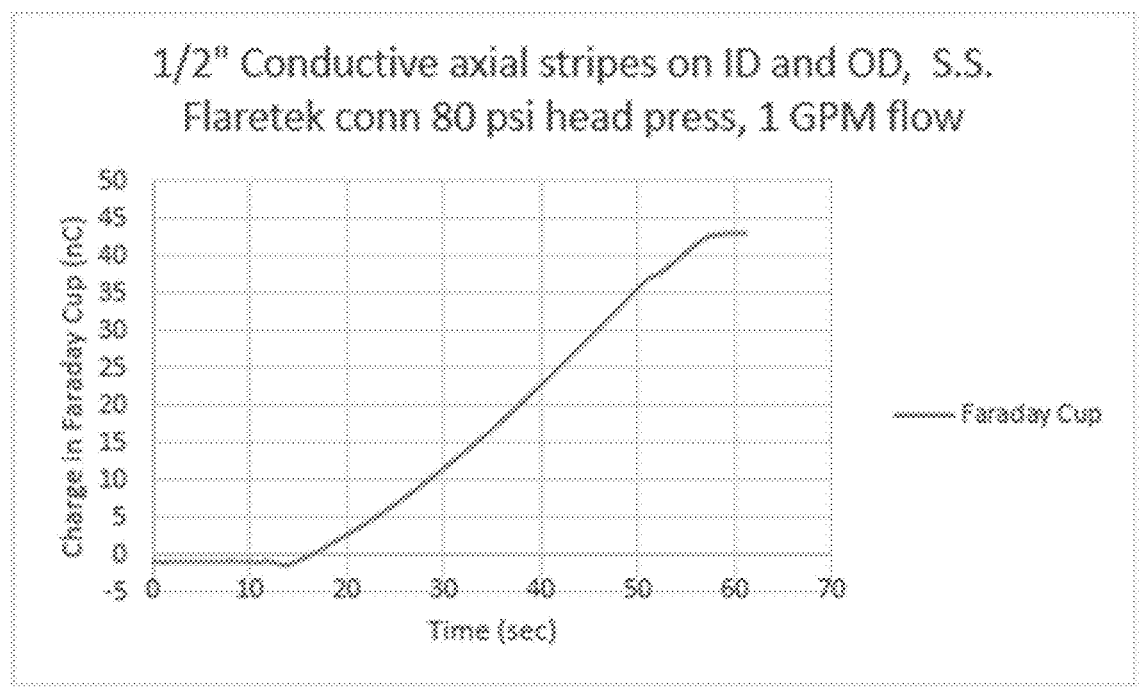
Figure 16:
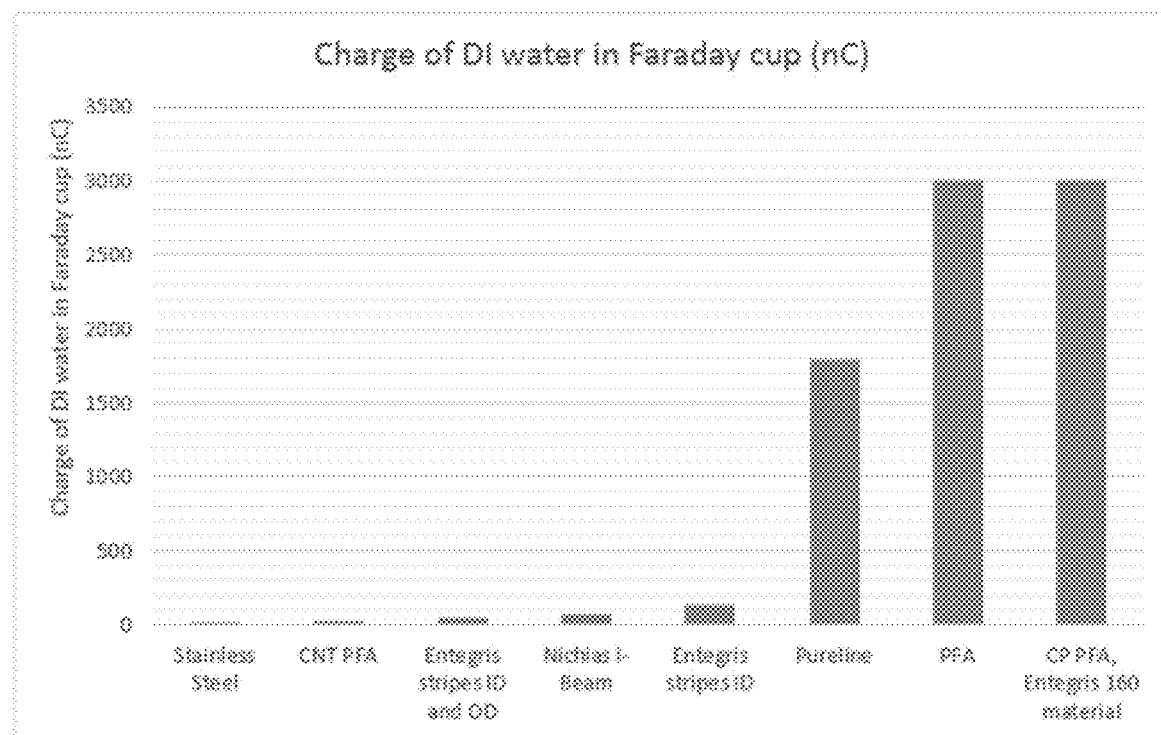
FIG. 16 graphically displays the measured amount of static electricity generated by various tubing segments tested in Example.

FIGS. 14-15 graphically illustrate the difference in static charge generation between a PFA/inner and outer diameter stripes tubing segment and a PFA/inner diameter stripes tubing segment having the same diameter under the same flow conditions. PFA/inner and outer diameter stripes tubing segment generated less static charge (about 43 nC) compared to the static charge generated by the PFA/inner diameter stripes tubing segment (about 115 nC).

Table 1 summarizes the measured amount of static electricity generated by various tubing segments tested in this example. These results are also graphically displayed in FIG. 16.

TABLE 1

| | Material | Cross Section | Charge in cup at conclusion of test (nC) | Range of voltage 1 cm from outside of tube. (V) | Charge in cup after grounding (nC) | DI water Resistivity (M-ohm) | Measured Resistance of lowest resistance material in contact with fluid or present on elsewhere (ohm) |
|---|---|---|---|---|---|---|---|
| 1 | Stainless Steel | Solid stainless steel | 14 | 25-175 | 3750 | 15.0 | |
| 2 | CNT PFA | Solid conductive material | 25 | 20 | 4000 | 17.5 | $1.2 \times 10^4 - 6.7 \times 10^5$ |
| 3 | Entegris striper ID and OD | Conductive stripes ID and OD | 45 | 10-35 | 4000 | 15.9 | $2.5 - 4.3 \times 10^4$ |
| 4 | Nichias I-Beam | Conductive I-beam ID to OD | 75 | 0-40 | 4000 | 17.0 | $2.5 - 4.3 \times 10^4$ |

TABLE 1-continued

| | Material | Cross Section | Charge in cup at conclusion of test (nC) | Range of voltage 1 cm from outside of tube. (V) | Charge in cup after grounding (nC) | DI water Resistivity (M-ohm) | Measured Resistance of lowest resistance material in contact with fluid or present on elsewhere (ohm) |
|---|---|---|---|---|---|---|---|
| 5 | Entegris stripes ID | Conductive Stripes ID only | 140 | 75-200 | 4000 | 16.7 | $2.5\text{-}4.3 \times 10^4$ |
| 6 | Pureline | Conductive Stripes OD only | 1800 | 100 | 4000 | 16.0 | $2.5 \times 10^4 \text{-} 2 \times 10^5$ |
| 7 | PFA | Solid PFA | 3000 | 500-3500 | 4000 | 17.0 | |
| 8 | CP PFA, Entegris 160 material | Solid conductive material | 3000 | −250 to 250 | 4000 | 17.8 | $2.7\text{-}2.9 \times 10^{12}$ |

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A fluid circuit for a predetermined fluid flow passageway having at least one inlet and at least one outlet, the fluid circuit comprising:
a plurality of tubing segments and a plurality of operative components, each operative component comprising a body portion with an internal fluid flow passageway and a plurality of tubing connector fittings, the operative components connecting the plurality of tubing segments at selected tubing connector fittings, the plurality of tubing segments and operative components providing the fluid flow passageway through the fluid circuit;
wherein each tubing segment comprises i) a non-conductive polymer portion defining the fluid passageway and ii) an one or more interior conductive stripes of conductive fluoropolymer extending axially to ends of each of the respective tubing segments, and
wherein each operative component body portion comprises a conductive fluoropolymer that extends between each of the plurality of tubing connector fittings, and
wherein each of the tubing connector fittings conductively connects the respective conductor of the body portion to the one or more interior conductive stripes of the tubing segment.

2. The fluid circuit of claim 1, wherein the plurality of operative components includes any one of a valve, a straight connector, a T-connector, an elbow connector, a multi-connector manifold, a filter, a heat exchanger, or a sensor.

3. The fluid circuit of claim 1, wherein the operative component is a valve comprising a body portion having a fluid passageway valve to adjust flow through the fluid passageway.

4. The fluid circuit of claim 1, wherein the tubing connector fittings have one or more inlet portions comprising a male nipple portion and a fitting nut, the male nipple portion having a threaded portion for engaging the fitting nut, where the fitting nut engages a conductive fluoropolymer of the operative component with the interior conductive stripes of a tubing segment end to conductively connect the conductive fluoropolymer and the interior conductive stripes of the tubing end.

5. The fluid circuit of claim 1, wherein one or more of the operative components comprises an attachment feature that conductively connects a conductive polymer of the respective operative component to ground.

6. The fluid circuit of claim 1, wherein the operative component is a filter comprising a body portion having a housing with a fluid passageway, a filter element and two conductive end caps with tubing connector fittings and conductive fitting nuts to conductively connect tubing segments connected to the filter, wherein the body portion has conductive exterior stripes to conductively connect the end caps.

7. The fluid circuit of claim 1, wherein the operative component comprises a filter having a conductive sleeve conductively connecting two conductive end caps to the exterior of the body portion.

8. The fluid circuit of claim 1, wherein the operative component is a filter comprising a body portion having a housing with a fluid passageway, a filter element and a single conductive end cap with tubing connector fittings and conductive fitting nuts to conductively connect tubing segments connected to the filter.

9. The fluid circuit of claim 1, wherein the operative component is a filter having a conductive sleeve to conductively connect a single end cap to the exterior of the body portion.

10. The fluid circuit of claim 1, wherein each of the plurality of operative components are conductively connected together.

11. The fluid circuit of claim 1, wherein each of the plurality of operative components are conductively connected together through the one or more interior conductive stripes of the tubing segments.

12. The fluid circuit of claim 1, wherein the tubing segments have a measured resistance of about $1.2 \times 10^4\text{-}6.7 \times 10^5$ ohm.

13. The fluid circuit of claim 1, wherein the non-conductive polymer portion comprises perfluoroalkoxy alkane (PFA) polymer and the one or more interior conductive stripes comprise carbon-loaded PFA.

14. The fluid circuit of claim 1, wherein the one or more interior conductive stripes comprise spirals.

15. The fluid circuit of claim 1, wherein the one or more interior conductive stripes comprise four stripes.

16. The fluid circuit of claim 1, wherein the one or more interior conductive stripes comprise eight stripes equally distributed around a perimeter of the fluid passageway.

17. The fluid circuit of claim 1, further comprising a conductive stripe located on an outer surface of the fluid circuit.

18. A fluid circuit defining a flow passageway for a fluid from a fluid supply toward a process stage, the fluid circuit comprising:
- a plurality of tubing segments and a plurality of operative components, each operative component comprising a body portion with an internal fluid flow passageway and a plurality of tubing connector fittings, the operative components connecting the plurality of tubing segments at selected tubing connector fittings, the plurality of tubing segments and operative components providing the fluid flow passageway through the fluid circuit;
- wherein each tubing segment comprises i) a non-conductive polymer portion defining the fluid passageway and ii) or more interior conductive stripes of fluoropolymer extending axially to ends of each of the respective tubing segments, wherein each operative component comprises a body portion comprising a conductive fluoropolymer that extends between each of the plurality of tubing connector fittings, wherein each of the tubing connector fittings conductively connect the respective conductor of the body portion to the at least one interior conductive strip polymer of the tubing segment, and
- wherein a path to ground is provided that extends through each operative component and each tubing segment.

19. A method of making an electrostatic discharge mitigation fluid circuit for a predetermined fluid flow passageway, having at least one inlet and at least one outlet comprising:
- connecting a plurality of tubing segments to a plurality of operative components, each operative component comprising a body portion with an internal fluid flow passageway and a plurality of tubing connector fittings, the operative components connecting the plurality of tubing segments at selected tubing connector fittings, the plurality of tubing segments and operative components providing the fluid flow passageway through the fluid circuit;
- wherein each tubing segment comprises i) a non-conductive polymer portion defining the fluid passageway and ii) an one or more interior conductive stripes of fluoropolymer extending axially to ends of each of the respective tubing segments,
- wherein each body portion comprises an conductive fluoropolymer that extends between each of the plurality of tubing connector fittings, and
- wherein each of the tubing connector fittings conductively connects the respective conductor of the body portion to at least one interior conductive fluoropolymer stripe of the tubing segment, and
- connecting the electrostatic discharge mitigation fluid circuit to ground.

20. The method of making the electrostatic discharge mitigation fluid circuit of claim 19, wherein the plurality of operative components includes any one of a valve, a straight connector, a T-connector, an elbow connector, a multi-connector manifold, a filter, a heat exchanger, or a sensor.

* * * * *